United States Patent [19]
Vollmar et al.

[11] Patent Number: 5,918,591
[45] Date of Patent: Jul. 6, 1999

[54] GAS HOT WATER HEATER SAFETY SHIELD

[76] Inventors: Tad F. Vollmar, 11668 Trumble-Loup West, Omaha, Nebr. 68123; Duane M. Emry, 114 Galvin Rd. North, Apt. 5A, Bellevue, Nebr. 68005

[21] Appl. No.: 08/848,923

[22] Filed: May 1, 1997

[51] Int. Cl.⁶ .................................................. F24H 1/00
[52] U.S. Cl. .................... 126/361; 126/350 K; 126/363; 122/13.1; 122/11; 122/14
[58] Field of Search .................................. 126/361, 344, 126/85 B, 350 R, 363; 122/13.1, 14, 11, 17, 18, 19, 16

[56] References Cited

U.S. PATENT DOCUMENTS

| | | | |
|---|---|---|---|
| 4,765,360 | 8/1988 | Baird | 137/312 |
| 4,909,274 | 3/1990 | Rodriguez | 137/312 |
| 5,085,205 | 2/1992 | Hall et al. | 126/363 |
| 5,199,385 | 4/1993 | Doss | 122/504 |
| 5,765,547 | 6/1998 | La Plante | 126/361 |

*Primary Examiner*—Larry Jones

[57] ABSTRACT

An appliance safety shield for gas-burning appliances to prevent heavier-than-air vapors from contacting a pilot light, the safety shield including a floor structure for mounting the safety shield thereon and a mounting strip mounted on the floor structure in generally fluid-tight connection therewith. The mounting strip extends circumferentially around the gas-burning appliance such that the mounting strip substantially completely surrounds the appliance. A generally flat, semi-rigid shield wall having a lower edge is mounted in the mounting strip in generally fluid-tight connection therewith such that the shield wall extends generally upright, the shield wall extending along the mounting strip such that the shield wall substantially completely surrounds the appliance. The shield wall, the mounting strip and the floor structure cooperate to restrict heavier-than-air vapor access to a gas-burning appliance whereby accidental ignition of flammable vapors is prevented.

8 Claims, 6 Drawing Sheets

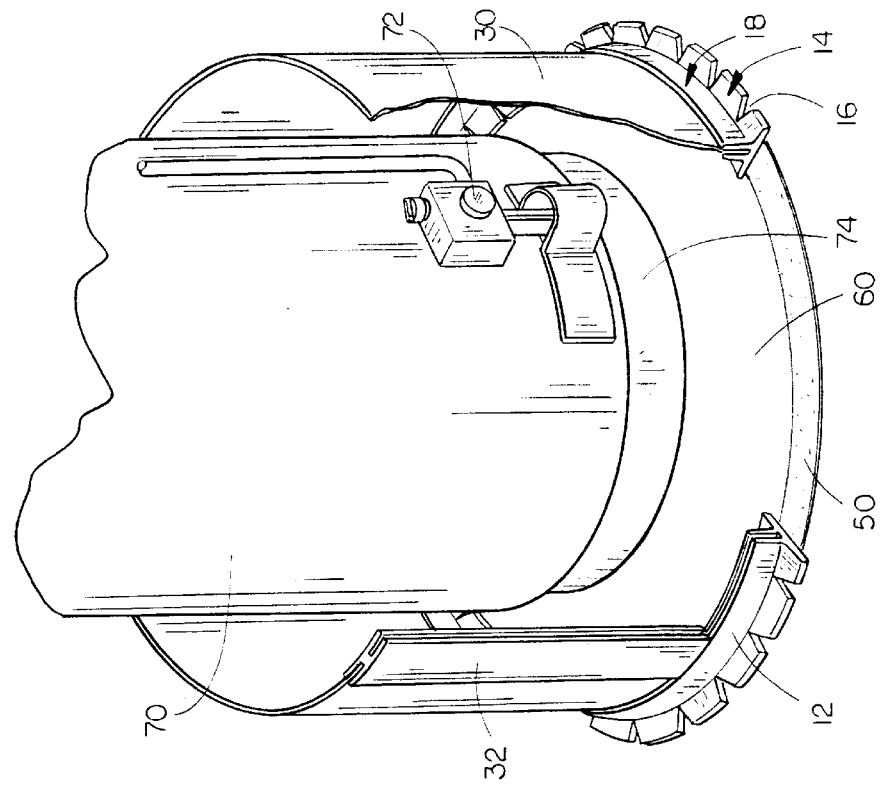
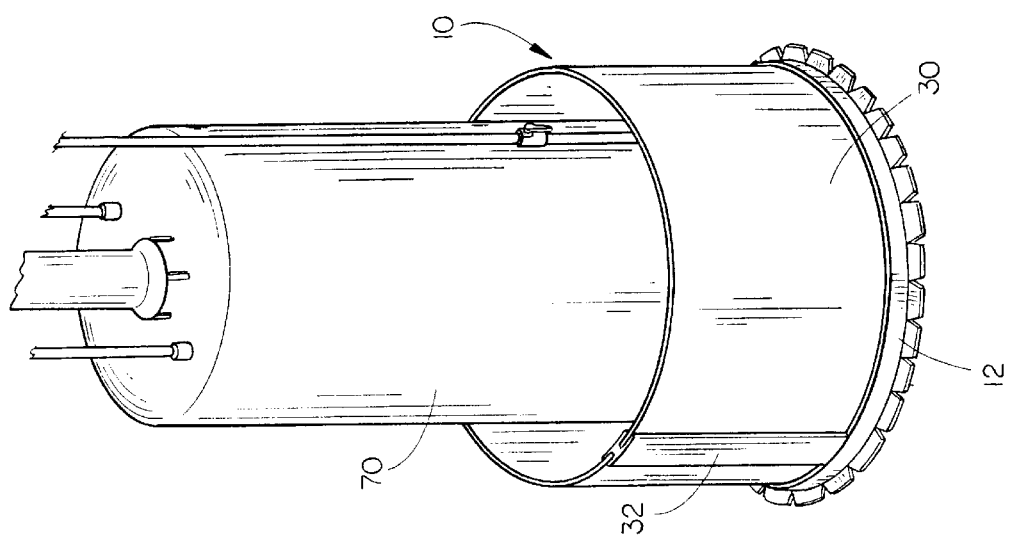

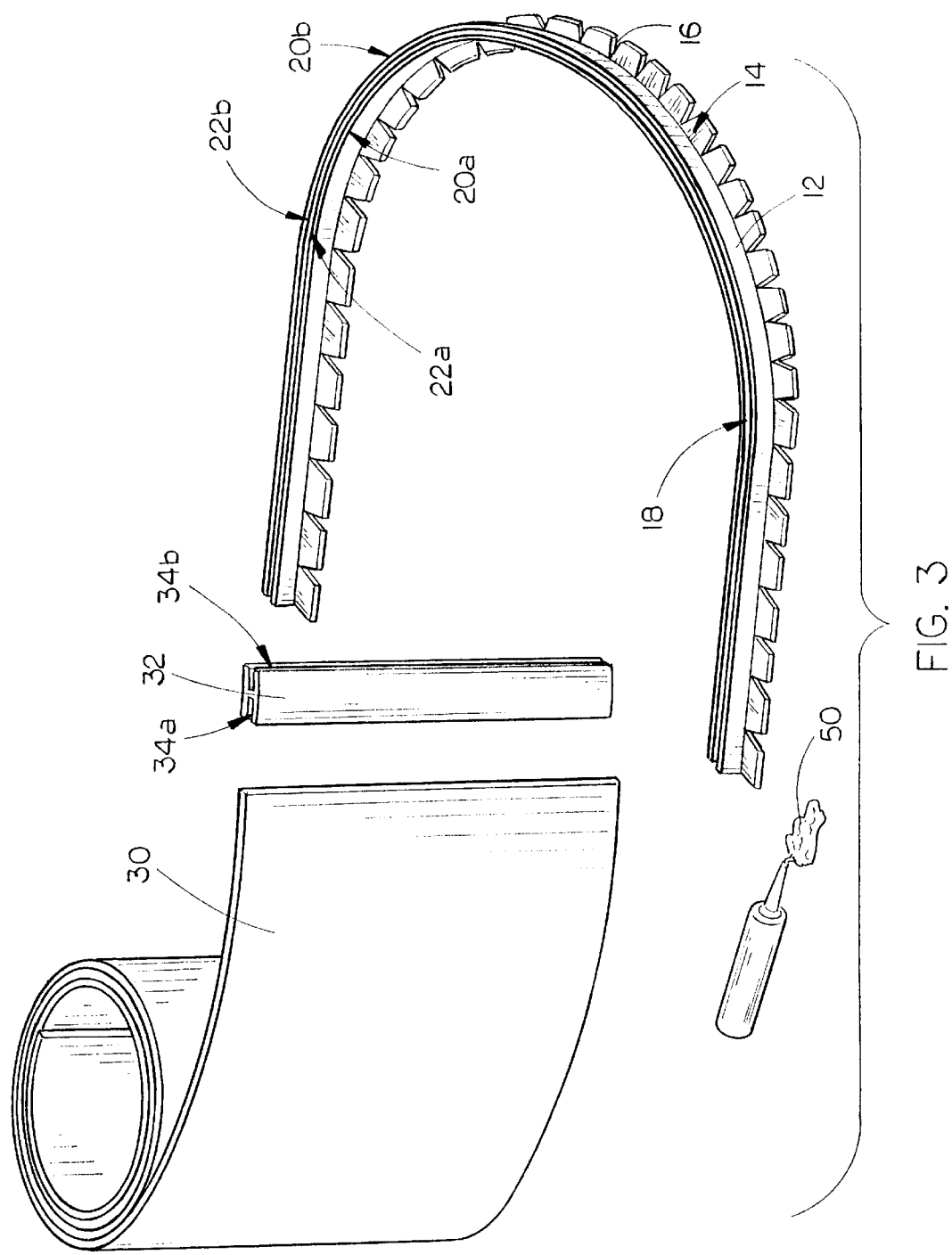

GAS HOT WATER HEATER SAFETY SHIELD

BACKGROUND OF THE INVENTION

1. Technical Field

This invention relates to protective devices for gas hot water heaters and, more particularly, to a gas hot water heater safety shield which includes a length of plastic or vinyl sheeting which is mounted circumferentially surrounding the base of the gas hot water heater, the sheeting extending upwards from the floor or a base plate approximately three feet, the sheeting mounted on the floor or base plate by a mounting device in fluid-tight connection with the floor or base plate, the safety shield thus acting to prevent heavier-than-air vapors from contacting the pilot light of the gas hot water heater.

2. Description of the Prior Art

The standard gas hot water in a residence is usually mounted in the basement of the residence on a low (six inch) metal stand. Three pipes usually feed into the gas water heater, a gas flow pipe, water inflow pipe and hot water outflow pipe. These are fed in from the ceiling of the basement and extends downwards to be connected to the gas hot water heater.

Most gas hot water heaters further include a pilot light which is a continually burning small flame inside the hot water heater adjacent the main gas burners usually positioned at the bottom of the hot water heater. The purpose of the pilot light is to ignite the outflowing gas when the gas is turned on thus heating the water held within the gas hot water heater.

To heat the water within the tank of the gas hot water heater most efficiently, the pilot light and main gas burners are usually positioned underneath the water tank at the bottom of the gas hot water heater. This means that the pilot light is usually only six to twelve inches off of the ground surface on which the hot water heater is placed. Furthermore, because the pilot light requires oxygen to burn, ventilation holes must be provided surrounding the pilot light to allow air to enter the gas hot water heater. For efficiency purposes, these air vents are usually located at the bottom of the gas hot water heater adjacent the pilot light. The end result is that in basements and/or garages where a gas hot water heater is placed, there is a generally open flame (the pilot light) only six to twelve inches above the floor.

Basements and garages are also used to store many other objects. These can and often do include hazardous chemicals and flammable materials such as turpentine, gasoline and other such volatile chemicals. Obviously, the degree of caution with which such items are stored varies from person to person and household to household but there have been numerous instances where such chemicals were stored near the gas hot water heater in the basement.

If a child, pet or any person were to accidentally spill a container containing such hazardous chemicals a serious problem may arise as the location of the spill approaches the location of the gas hot water heater, as is shown in FIG. 6a. The danger does not arise from the liquid itself, but rather from the heavier-than-air vapors emitted by the volatile chemical as it pools on the floor. The flammable vapors can travel over the floor surface beyond the perimeter of the liquid spill, subject to the vagaries of the air currents in the basement or garage. It is important to note, however, that due to the heat radiating from the hot water heater, there is an upward flow of hot air from the area surrounding the hot water heater which results in cooler air being pulled in from underneath the rising column of warm air. Therefore, there is often a slight air flow towards the base of the gas hot water heater which, in normal circumstances, helps to provide air circulation thus insuring oxygen flow to the pilot light. In a situation where a spill of a volatile chemical has occurred in the area of the gas hot water heater, this inflow of air from the area surrounding the gas hot water heater will tend to draw the heavier-than-air vapors emitted by the volatile chemical towards to the gas hot water heater base. The danger thus becomes apparent, as the vapors can be sucked into the gas hot water heater through the air flow vents surrounding the pilot light. When the vapors contact the pilot light, the vapors may be ignited by the pilot light, the vapor acting as a type of "fuse" leading back to the original liquid chemical spill. In a matter of seconds the entire spill can be set afire, igniting all other combustible objects in the area and quickly engulfing the basement or garage in flames. There is therefore a need for a protective device to prevent heavier-than-air vapors such as those described above from contacting the pilot light of the gas hot water heater.

Some manufacturers of gas hot water heaters have attempted to solve the problem of heavier-than-air vapors by placing a warning sticker on the gas hot water heater itself and placing the gas hot water heater on a three foot high stand that can be installed under the water heater. While this solution may be marginally acceptable for new homes in which the hot water heater may be installed as a new unit, it is clear that such a solution is impractical as a retrofit kit for already installed gas hot water heaters. One can envision the ordeal involved in moving the hot water heater upwards two and one-half feet, including cutting, shortening and/or rerouting the pipe described previously, lifting the heavy hot water heater unit to the correct height, changing the height of the exhaust opening to correspond to the new height of the hot water heater and, finally, resetting the hot water heater on the new taller stand. Furthermore, the additional height of the gas water heater will render the heater more unstable as the center of gravity of the unit has been raised a greater distance above the floor. Therefore, the gas hot water heater may be more prone to tipping over in the event of earthquakes or the like. There is therefore a need for a safety device for gas hot water heaters which can be used with both new and already installed heater units.

Therefore, an object of the present invention is to provide an improved gas hot water heater safety device.

Another object of the present invention is to provide a gas hot water heater safety shield which includes a floor-mounted plastic or vinyl fluid-impervious sheet material extending circumferentially around the base of the gas hot water heater and extending upwards to a height of approximately three feet which will act to prevent heavier-than-air vapors from contacting the pilot light and possibly igniting.

Another object of the present invention is to provide a gas hot water heater safety shield which may be quickly and easily mounted to the surrounding floor adjacent the gas hot water heater by a plastic fluid-impervious sheet mounting strip which is mounted in fluid-tight relation to the floor itself.

Another object of the present invention is to provide a gas hot water heater safety shield which may be installed on a plate mounted to the underside of the hot water heater unit itself so that the gas hot water heater may be shipped from the factory with the safety shield already installed thereon.

Another object of the present invention is to provide a gas hot water heater safety shield which is constructed of relatively inexpensive materials to insure that the safety device may be afforded by all persons owning gas water heaters.

Another object of the present invention is to provide a gas hot water heater safety shield which may be mounted on the floor adjacent the gas hot water heater in a variety of different configurations to permit the shield to be used in the greatest number of environments and setups.

Finally, an object of the present invention is to provide a gas hot water heater safety shield which is relatively simple and inexpensive to manufacture and is safe and efficient to use.

SUMMARY OF THE INVENTION

The present invention provides an appliance safety shield for gas-burning appliances which is designed to prevent heavier-than-air vapors from contacting a pilot light. The safety shield includes a floor structure for mounting the safety shield thereon and a mounting strip mounted on the floor structure in generally fluid-tight connection therewith. The mounting strip is mounted by an adhesive such as epoxy or two-sided tape, and the floor structure is either the floor or a plate fastened to the underside of the gas-burning appliance. The mounting strip extends circumferentially around the gas-burning appliance such that the mounting strip substantially completely surrounds the appliance. A generally flat, semi-rigid shield wall having a lower edge is mounted in the mounting strip in generally fluid-tight connection therewith such that the shield wall extends generally upright, the shield wall extending along the mounting strip such that the shield wall substantially completely surrounds the appliance. The shield wall, the mounting strip and the floor structure cooperate to restrict heavier-than-air vapor access to a gas-burning appliance whereby accidental ignition of flammable vapors is prevented.

The gas hot water heater safety shield of the present invention is designed to provide protection for the pilot light of the gas-burning appliance against the accidental spillage of flammable liquids such as gasoline or turpentine. By creating a generally fluid-tight ring around the appliance, heavier-than-air vapors sublimating from the spilled liquid are prevented from contacting the pilot light. Also, because the device may be quickly and easily added to existing gas-burning appliances, the safety shield may be used for protection in older houses which may most need such protection. Finally, because the safety shield is relatively inexpensive to manufacture, it will be affordable by almost all homeowners and landlords, thus making the protection offered by the safety shield available to many persons. The safety shield of the present invention thus provides a substantial improvement over those devices found in the prior art.

BRIEF DESCRIPTION OF THE DRAWINGS

FIG. 1 is a perspective view of the gas hot water heater safety shield mounted on the floor adjacent a gas hot water heater;

FIG. 2 is a detail perspective view of the safety shield of the present invention showing in cutaway detail how the safety shield surrounds the hot water heater;

FIG. 3 is a detail perspective view of the individual elements of the safety shield;

DESCRIPTION OF THE PREFERRED EMBODIMENT

Figure 4A:
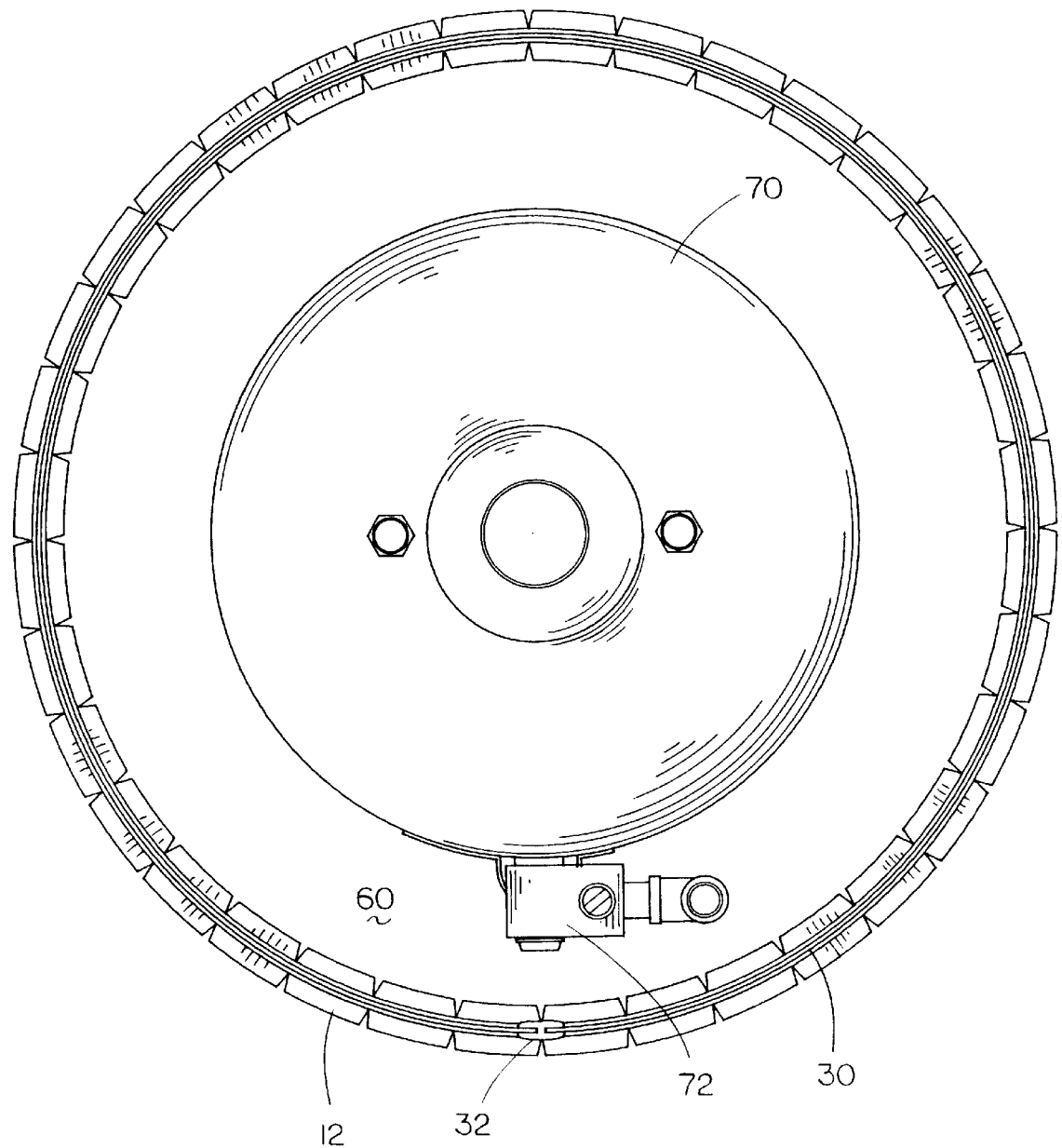
FIGS. 4a, 4b, and 4c are top plan views of the gas hot water heater safety shield in different mounting positions surrounding a hot water heater.

The gas hot water heater safety shield 10 of the present invention is best shown in FIGS. 1–4c as including a mounting strip 12, a semi-rigid shield wall 30 mounted in and extending vertically upwards from the mounting strip 12 and an adhesive material 50 for mounting the mounting strip 12 on the floor 60 adjacent the gas hot water heater 70 to form a fluid-tight seal between the floor 60 and mounting strip 12.

In the preferred embodiment, the mounting strip 12 will preferably be a plastic molding having an inverted "T" shaped cross section, as shown best in FIGS. 2 and 3. The flat base 14 of the mounting strip 12 is preferably between one inch and three inches in width and is approximately one-eighth inch thick. Furthermore, the base 14 should have as flat underside as possible to ensure a good seal between the base 14 of mounting strip 12 and the floor 60. Base 14 of mounting strip 12 preferably further includes a plurality of V-shaped notches 16 formed therein extending inwards from the outer edges of base 14 as shown best in FIGS. 1–4c. The V-shaped notches 16 are preferably spaced approximately every one to two inches along the base 14 of mounting device 12 and permit the mounting strip 12 to be laid on the floor 60 in a variety of different curved shapes, as shown best in FIGS. 4a, 4b, and 4c. Of course, the mounting strip 12 may be constructed of a different material with the base 14 of mounting strip 12 constructed of a very flexible plastic to allow the base to distort without separating the base 14 from floor 60, but it is preferred that the above-described system of V-shaped notches be formed in base 14 to permit curvature of mounting strip 12.

Extending generally vertically upwards from base 14 is an upright groove 18 having inner and outer flanges 20a and 20b which cooperate to form upright groove 18 as show best in FIGS. 1, 2, and 3. In the preferred embodiment, the height of upright groove 18 would be approximately one-half inch to one inch, although the exact dimensions are not critical to the invention so long as the upright groove 18 is capable of receiving lower edge of the semi-rigid shield wall 30 therein. It is preferred that the upper edges 22a and 22b of flanges 20a and 20b be thicker than the lower ends of flanges 20a and 20b in order to narrow the distance between the flanges 20a and 20b, as shown in FIG. 2. It is preferred that groove 18 has a width of approximately one-eighth to one-quarter of an inch and that this would be narrowed substantially by the thicker portions 22a and 22b of flanges 20a and 20b adjacent the top portions thereof. In this matter, as shield wall 30 is inserted into upright groove 18, flanges 20a and 20b deform inwards and outwards respectively to permit the shield wall 30 to be seated within the upright groove 18. As the mounting strip 12 is preferably constructed of a semi-rigid plastic capable of elastic deformation, flanges 20a and 20b will attempt to return to their original positions even when the shield wall 30 is placed therebetween. The thickened portions of 22a and 22b of flanges 20a and 20b thus will engage shield wall 30 in a very tight manner and as it is preferred that flanges 20a and 20b and shield wall 30 be generally smooth, the seal formed by the thickened portions 22a and 22b of flanges 20a and 20b in contacting shield wall 30 will be generally fluid-tight. Of course, the exact sizes, shapes and dimensions of the upright groove 18 may be modified so long as the generally fluid-tight seal is formed when shield wall 30 is fit within upright groove 18.

Figure 4B:
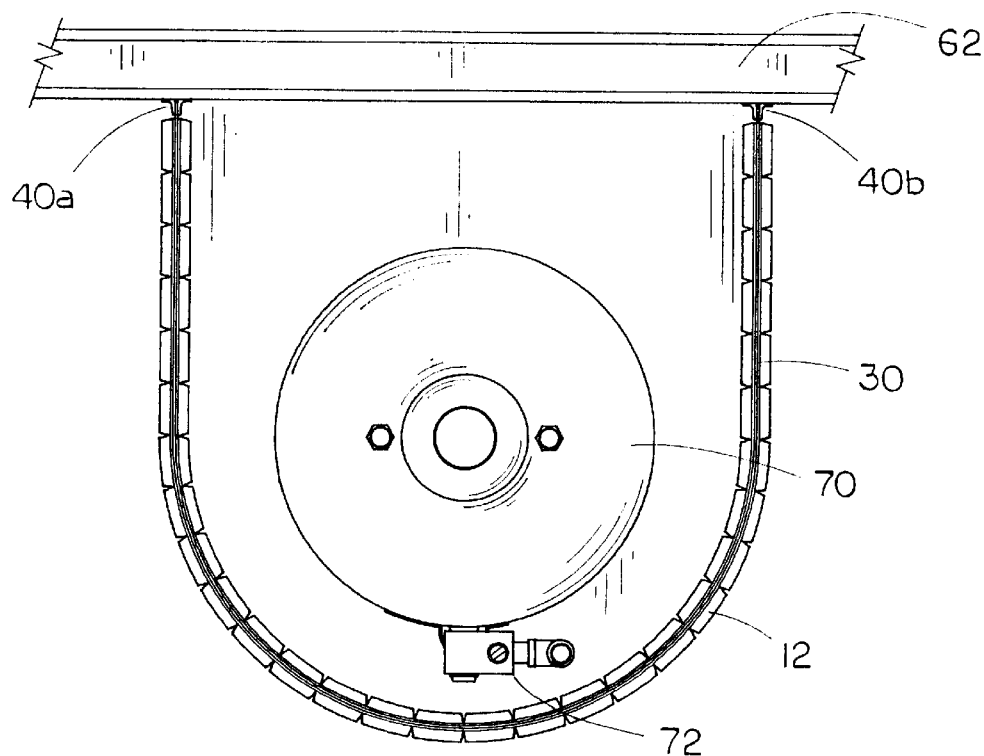
Figure 4C:
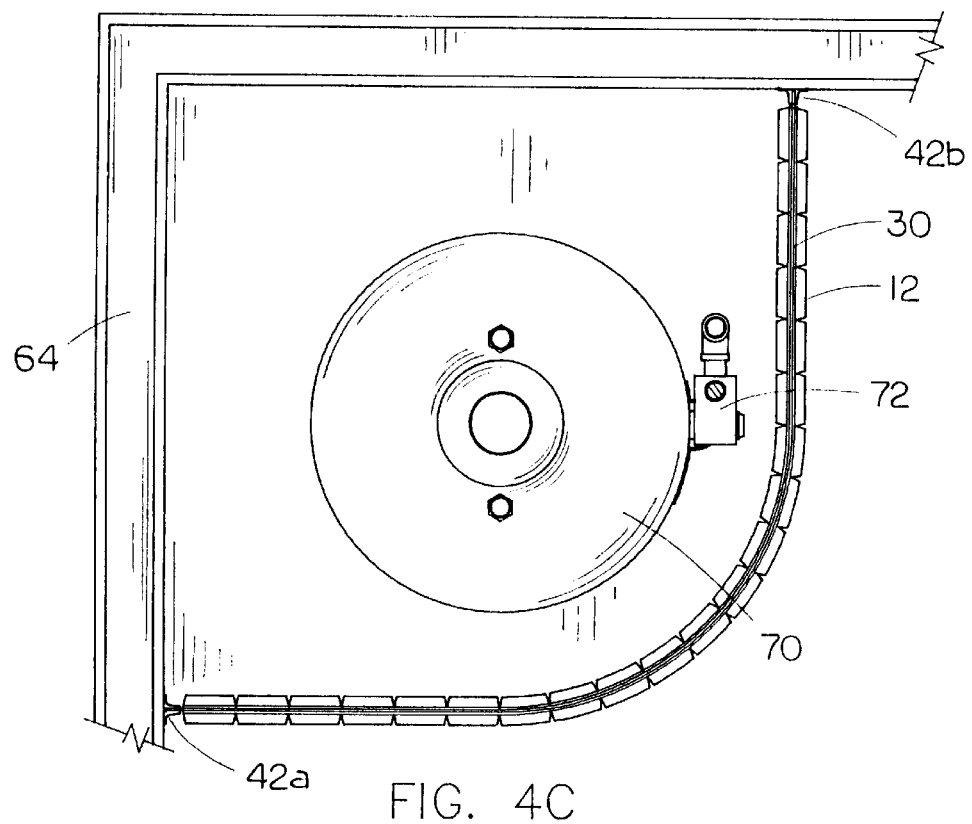

The semi-rigid shield wall 30 is best shown in FIGS. 1–3 as being preferably constructed of plastic or vinyl approximately one-eighth of an inch thick. The thickness of the plastic or vinyl sheeting will ordinarily depend on the rigidity of the construction material and the width of upright groove 18, and, therefore, may be varied or adjusted, but it is expected that a thickness of one-eighth inch will provide sufficient rigidity to allow the shield wall 30 to extend upright yet retain sufficient flexibility to allow the shield wall 30 to be curved in a variety of layouts as best shown in FIGS. 4a, 4b and 4c.

In the preferred embodiment, shield wall 30 would preferably have a height of approximately three feet, which has been found to achieve a substantial amount of protection against flammable vapor entry. Of course, the height of the shield wall 30 may be varied, so long as the height of the shield wall 30 is sufficient to prevent heavier-than-air vapors from flowing over the top thereof and contacting the pilot light of the gas hot water heater 70. In fact, it is one of the features of the present invention that the shield wall 30 may be quickly and easily removed from and replaced on the mounting strip 12. Therefore, no matter what the height of the shield wall 30, the servicer of the hot water heater 70 can access the hot water heater controls 72 without encountering a great deal of difficulty by merely disengaging the shield wall 30 from mounting strip 12. It is preferred that the overall length of the shield wall 30 be approximately ten feet in order to completely surround the gas hot water heater 70 as shown in FIG. 1. The exact length of the shield wall 30 is not critical to the invention, so long as the shield wall 30 is able to extend around the entire gas hot water heater 70.

The ends of the shield wall 30 may be connected to one another by any appropriate fluid-tight connection method, although it is expected that the two ends of the shield wall 30 will be connected to one another by a connection strip 32 having a generally H-shaped cross-sectional shape. In fact, the connection strip 32 functions in substantially the same way as the mounting strip 12, as the ends of shield wall 30 are slid into the left and right grooves 34a and 34b of connection strip 32 and are held therein in a fluid-tight connection in the same manner as was described in connection with upright groove 18 of mounting strip 12.

The final critical element of the gas hot water heater safety shield 10 is the adhesive 50 which is shown best in FIGS. 2 and 3. In the preferred embodiment, the adhesive 50 would preferably be a liquid or gelatinous adhesive capable of securing plastic to concrete, metal, glass or other such surface the mounting strip 12 will be affixed to. Furthermore, the adhesive must be resistant to dissolution due to contact with volatile substances such as gasoline, turpentine and other such chemicals. An example of such adhesive would be RTV clear adhesive manufactured by Dow-Corning Chemicals. Of course, it is to be understood that numerous different types of adhesives may be used with the safety shield 10 of the present invention, and it may even be preferable to include such adhesive means such as two-sided tape or other such acceptable substitutes.

If a two-sided tape were used with the present invention, it may be desirable to include downwardly-extending flanges on the sides of base 14 of mounting strip 12 which will be of sufficient height to rest on the floor surface when the mounting strip 12 is mounted thereon by the two-sided tape. Such flanges will help prevent spilled liquids from contacting the two-sided tape and possibly causing the tape to disengage from the floor or the mounting strip 12. Of course, many variations of adhesives may be used with the present invention so long as the seal between the mounting strip 12 and the floor is maintained. In fact, it may be preferable to removably mount the safety shield 10 by weighting the mounting strip 12 to engage the floor and prevent vapors from entering the gas hot water heater 70. This will permit the safety shield 10 to be removably placed around the heater unit without requiring the placing of adhesive on the floor with the potential for residue after removal.

The gas hot water heater safety shield 10 of the present invention, when being installed surrounding a hot water heater 70 which is spaced more than six inches from surrounding walls, is preferably installed in the following manner. On the floor 60 surrounding the hot water heater 70, the installer would measure radially outwards from the hot water heater base 74 approximately five inches in several different spots around the circumference of the hot water heater 70 in order to mark out a circle surrounding the hot water heater 70 which is based approximately five inches from the hot water heater 70 itself. The circle thus formed is measured to determine the length of mounting strip needed to completely surround the gas hot water heater 70. This measurement may be performed in any appropriate means, although it is preferred that a cloth tape or a marked piece of string be used to properly measure the circumference of the circle. The mounting strip 12 is then cut to the length determined by the circumference of the marked circle and then the precise length of the mounting strip 12 that was just cut is measured along upright groove 18 of mounting strip 12. This measurement must be accurate, as this measurement will determine the length of the shield wall 30 which will be fit onto the mounting strip 12.

Once the above measurement is taken, the mounting strip 12 should then be mounted to the floor 60 along the circle which was previously marked around the hot water heater 70. The adhesive 50 may be applied to the underside of the mounting strip 12 prior to pressing mounting strip 12 onto floor 60, or the adhesive 50 may be applied to the floor 60 along the marked circle and then the mounting strip 12 may be placed thereon. It is preferable, however, that the adhesive 50 be applied to the mounting strip 12 in order to ensure that the strip is correctly mounted on the floor 60.

Once the mounting strip 12 is adhered to the floor 60 by adhesive 50, the shield wall 30 is prepared for mounting on the mounting strip 12. The measurement obtained along upright groove 18 of mounting strip 12 is used to determine the overall length of shield wall 30 except that a distance of one-eighth to one-half inch must be subtracted from that measurement due to the width of connection strip 32. The shield wall 30 is then cut to that length along a line perpendicular to the top edge of the shield wall 30 to achieve the correct dimensions for the shield wall 30.

Once the shield wall 30 has been correctly sized, the lower edge of the shield wall 30 is inserted into the mounting strip 12 and upright groove 18 thereof as was previously described. Once the lower edge of the shield wall 30 is set without upright groove 18 of mounting strip 12 the ends of shield wall 30 are then connected to one another by connection strip 32, as shown in FIGS. 2 and 4a.

In general, a small crack anywhere in the connections will not be dangerous, but it may be preferable to place a small piece of tape over the small crack to prevent any vapor entry into the enclosed space within the shield wall 30. The reason that such a small leak will not pose any danger of vapor ignition is that normal air flow within the shield wall 30 will quickly dissipate small amounts of flammable vapor. It is only when vapor concentrations reach certain levels that the danger of ignition become real.

Once the above steps are completed, the safety shield 10 of the present invention is installed surrounding the gas water heater 70 as shown in FIG. 4*a*. FIGS. 4*b* and 4*c* show alternative installation arrangements of the safety shield 10 of the present invention which are designed to be used when the hot water heater 70 is in close proximity to a wall or a corner. Briefly, the above-steps are followed in much the same fashion, with the only difference being that the wall 62 adjacent the hot water heater 70 is used to provide part of the circumference of the safety shield 10. In FIG. 4*b*, the ends of the shield wall 30 are affixed to the wall 62 by vertically mounted securement strips 40*a* and 40*b* which are substantially the same as the mounting strip 12 described previously. Similarly, in FIG. 4*c*, the shield wall 30 is affixed to wall 64 by similar securement strips, 42*a* and 42*b*. Of course, FIGS. 4*a*, 4*b* and 4*c* illustrate only three of the numerous variations in shape of the safety shield 10 of the present invention, which could conceivably include ellipses and other such shapes, depending upon the needs and desires of the installer of the safety shield 10.

Figure 5:
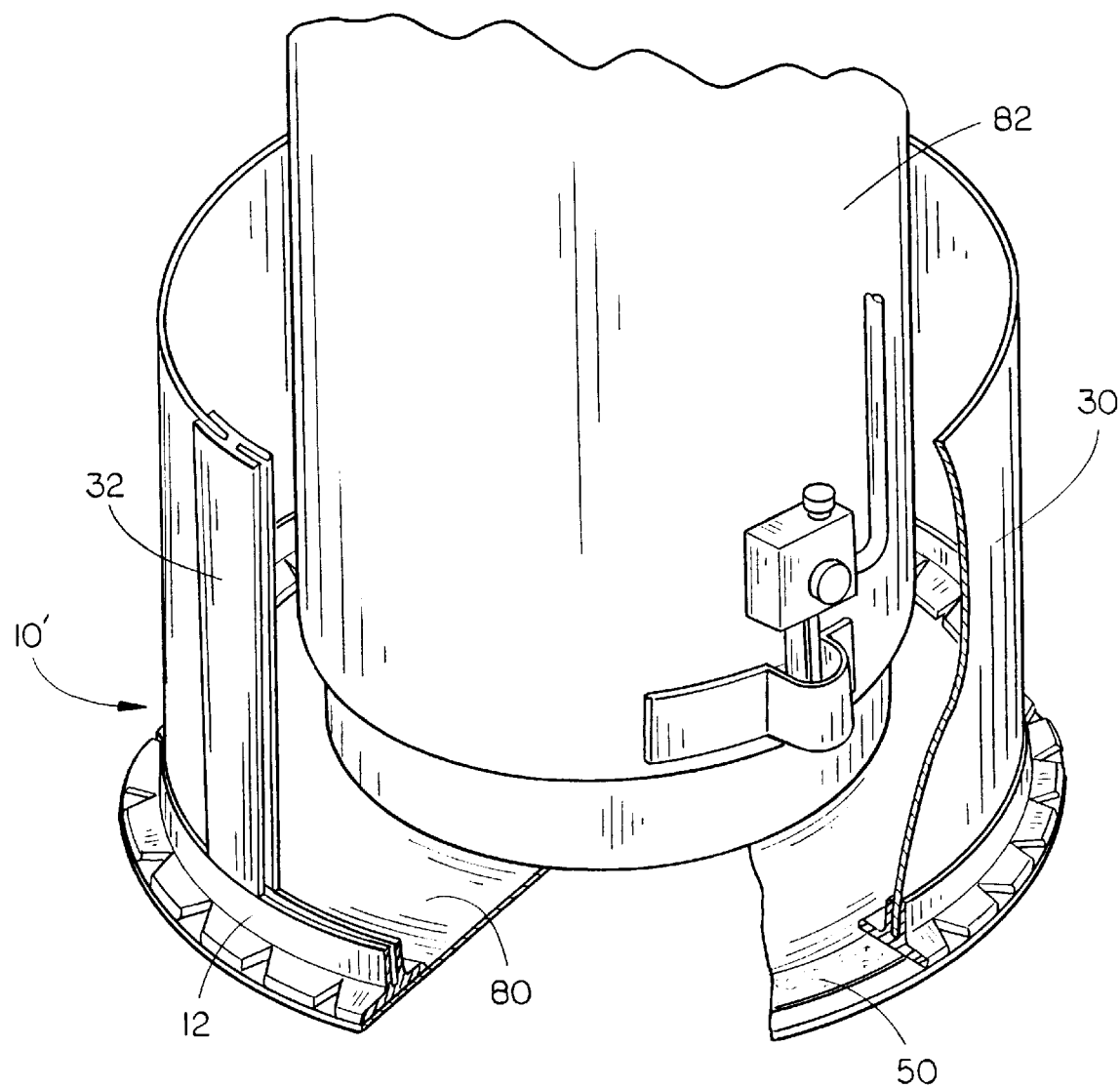
FIG. 5 is a detailed perspective view of an alternative embodiment of the gas hot water heater safety shield in which the safety shield is mounted on a plate affixed to the underside of the hot water heater and thus is elevated above the floor.

FIG. 5 illustrates an alternative embodiment of the present invention. In almost all respects, the safety shield 10' shown in FIG. 5 is identical to the safety shield 10 shown in FIGS. 1–4*c*. However, the safety shield 10' of FIG. 5 is shown mounted on a plate 80 affixed to the underside of the gas hot water heater 82. This plate 80 replaces floor 60 as the location on which the safety shield 10' is mounted. In the preferred embodiment, plate 80 is preferably a solid metal plate affixed to the underside of hot water heater 82 as shown in FIG. 5, the plate 80 acting to prevent heavier-than-air vapors from flowing up into the hot water heater 82 from underneath the hot water heater 82. In fact, plate 80 may be constructed of any structurally sound material capable of supporting the safety shield 10' thereon and capable of resisting vapor entry, but it is expected that a metal plate will provide the longest lifespan for the product. One of the obvious benefits of the safety shield 10' shown in FIG. 5 is that the hot water heater 82 may be installed with the safety shield 10' at the factory and shipped out including the safety device. This will prevent the need for retrofitting of the gas hot water heater 82 after installation and will also provide an extra degree safety as the household owner need not decide whether to install the safety shield or not. Of course, the plate 80 may be installed on the hot water heater 82 in a variety of locations, so long as the plate 80 prevents vapor contact with the pilot light of the gas hot water heater 82.

Figure 6A:
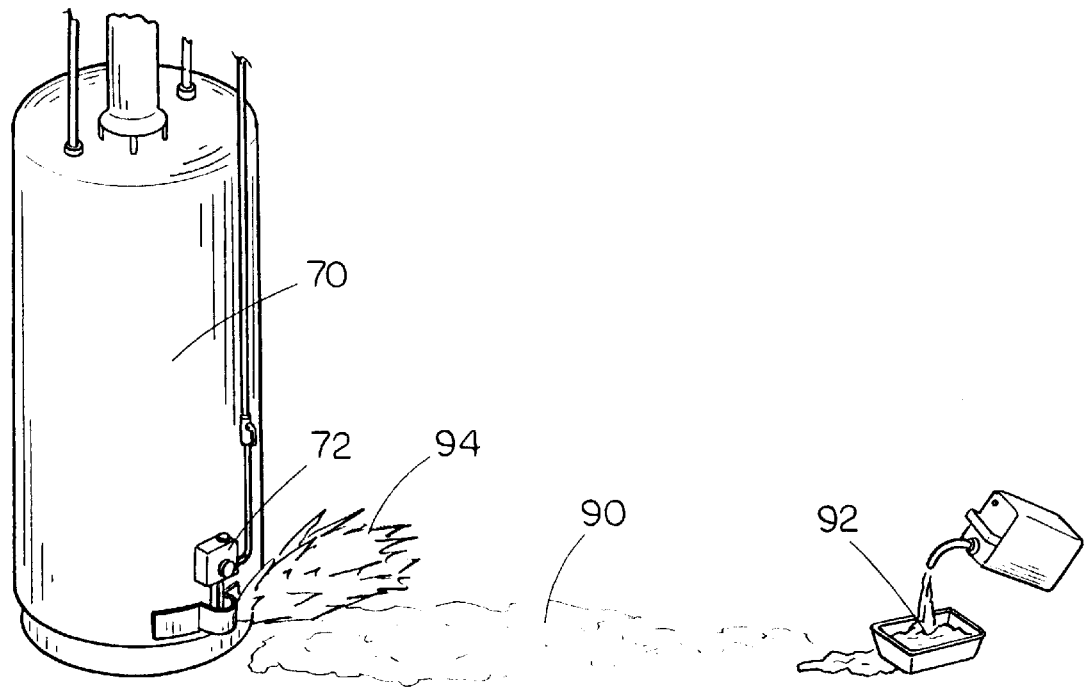
FIG. 6a is a perspective view of the prior art showing the hot water heater without the shield in place, in which a spill of flammable liquid has occurred and the flammable vapors issuing therefrom have been ignited.
Figure 6B:
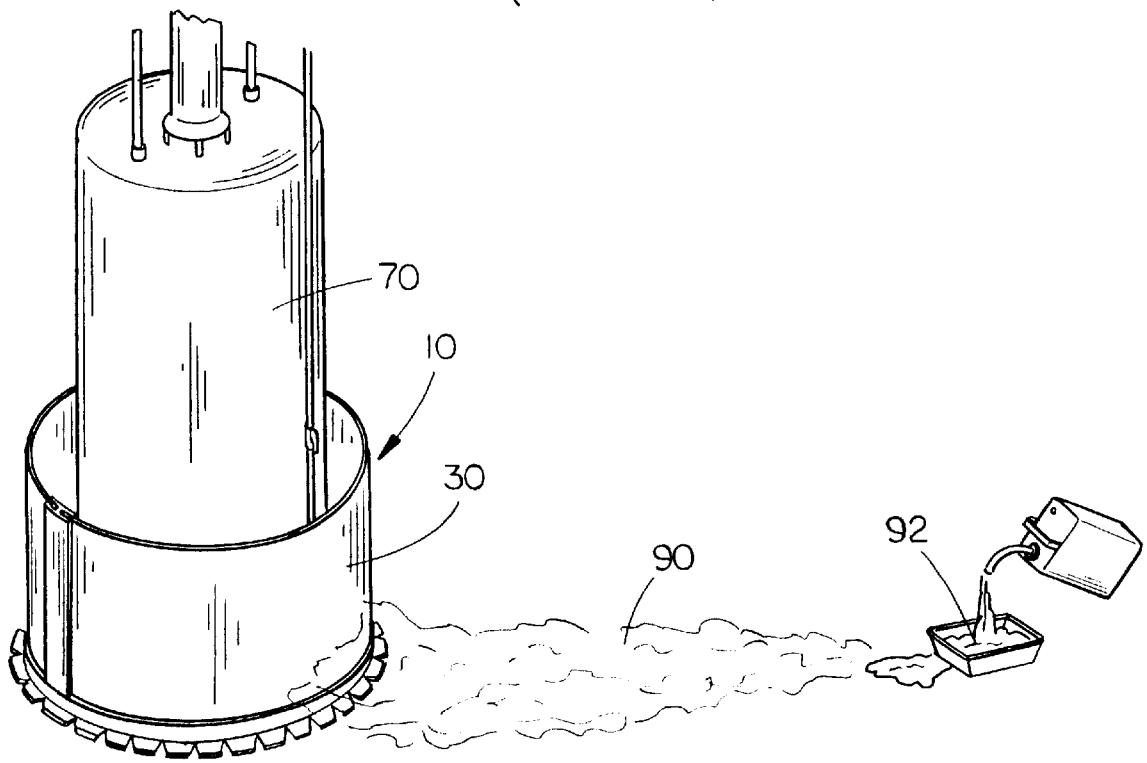
FIG. 6b is a perspective view of the safety shield of the present invention protecting a hot water heater from flammable heavier-than-air vapors surrounding the heater unit.

FIGS. 6*a* and 6*b* show, respectively, the prior art (no shield) and the safety shield 10 of the present invention. As shown, a flammable liquid 92 such as gasoline has spilled on the floor and flammable vapors 90 are vaporizing off of the surface of the spilled liquid 92. In FIG. 6*a*, the vapors 90 have contacted the pilot light of the gas hot water heater 70 and have ignited, resulting in flames 94 shooting out from the heater unit. Any flammable materials near the heater 70 will be ignited by the flames 94, possibly resulting in the entire house burning to the ground.

Contrast the above scenario with the scenario presented in FIG. 6*b* in which the safety shield 10 of the present invention has prevented the flammable vapors 90 from contacting the pilot light, thus preventing ignition of the vapors 90. It is thus seen that the present invention provides a novel and safe device for preventing ignition of flammable vapors 90.

It is to be understood that numerous modifications, substitutions and additions may be made to the gas hot water heater safety shield 10 of the present invention which fall within the intended broad scope of the appended claims. For example, the safety shield 10 may be used to enclose any gas-burning appliance, specifically such devices as gas furnaces, to protect the appliance from vapor contact. Furthermore, the shield wall 30 may be quickly and easily removed from the mounting strip 12 to allow for easy access to the hot water heater 70 for maintenance. Also, the exact size, shape and dimensions of the various elements described herein may be modified or changed so long as the functional characteristics of the elements is not affected. Likewise, the adhesive 50 used in the present invention may be modified or changed so long as it accomplishes its intended purpose.

There has therefore been shown and described a gas hot water heater safety shield which accomplishes at least all of the stated objectives.

We claim:

1. An appliance safety shield for gas-burning appliances to prevent heavier-than-air vapors from contacting a pilot light, said safety shield comprising:

a floor structure for mounting said safety shield thereon;

mounting means mounted on said floor structure in generally fluid-tight connection therewith, said mounting means extending circumferentially around the gas-burning appliance such that said mounting means substantially completely surrounds the appliance;

a generally flat, semi-rigid shield wall having a lower edge;

said shield wall removably mounted in said mounting means in generally fluid-tight connection therewith such that said shield wall extends generally upright, said shield wall extending along said mounting means such that said shield wall substantially completely surrounds the appliance;

said shield wall, said mounting means and said floor structure cooperating to restrict heavier-than-air vapor access to a gas-burning appliance whereby accidental ignition of flammable vapors is prevented.

2. The safety shield of claim 1 wherein said floor structure comprises a floor surface.

3. The safety shield of claim 1 wherein said floor structure comprises a generally flat plate mounted underneath the gas-burning appliance, said plate extending generally perpendicularly outwards from the appliance such that said safety shield is mounted on said plate surrounding the appliance.

4. The safety shield of claim 1 wherein said mounting means comprises a semi-rigid plastic mounting strip having an inverted "T" shaped cross section and further including a ground-engaging generally flat base and an upright groove having inner and outer flanges, said upright groove operative to accept and support said shield wall therewithin.

5. The safety shield of claim 4 wherein said shield wall comprises a semi-rigid plastic sheet having a thickness approximately equal to the width of said upright groove.

6. The safety shield of claim 5 wherein said mounting strip is mounted on said floor structure by an adhesive means, said lower edge of said shield wall being inserted into said upright groove of said mounting strip such that said shield wall extends generally upright, said lower edge of said shield wall and said upright groove cooperating to form a generally fluid-tight seal to prevent passage of heavier-than-air vapors therethrough.

7. An appliance safety shield for gas-burning appliances to prevent heavier-than-air vapors from contacting a pilot light, said safety shield comprising:

a floor structure for mounting said safety shield thereon;

mounting means releasably mounted on said floor structure in generally fluid-tight connection therewith, said mounting means extending circumferentially around the gas-burning appliance such that said mounting means generally surrounds the appliance;

a generally flat, semi-rigid shield wall having a lower edge;

said shield wall removably mounted in said mounting means in generally fluid-tight connection therewith such that said shield wall extends generally upright, said shield wall extending along said mounting means such that said shield wall generally surrounds the appliance;

said shield wall, said mounting means and said floor structure cooperating to restrict heavier-than-air vapor access to a gas-burning appliance whereby accidental ignition of flammable vapors is prevented.

8. In combination:

a gas-burning appliance having a pilot light; and a gas-burning appliance safety shield to prevent heavier-than-air vapors from contacting said pilot light, said safety shield comprising;

a generally flat plate mounted underneath said gas-burning appliance, said plate extending generally perpendicularly outwards from said appliance;

a mounting strip mounted on said plate in generally fluid-tight connection therewith, said mounting strip extending circumferentially around said gas-burning appliance such that said mounting strip substantially completely surrounds said appliance;

a generally flat, semi-rigid shield wall removalby having a lower edge;

said shield wall mounted in said mounting strip in generally fluid-tight connection therewith such that said shield wall extends generally upright, said shield wall extending along said mounting strip such that said shield wall substantially completely surrounds said appliance;

said shield wall, said mounting strip and said plate cooperating to restrict heavier-than-air vapor access to said gas-burning appliance whereby accidental ignition of flammable vapors is prevented.

* * * * *